United States Patent Office 3,595,707
Patented July 27, 1971

3,595,707
FORGED ANTI-FRICTION BEARING COMPONENT MANUFACTURE
Richard L. Faunce and William M. Justusson, Farmington, Mich., assignors to Ford Motor Company, Dearborn, Mich.
No Drawing. Filed June 9, 1969, Ser. No. 831,736
Int. Cl. C21d 7/14, 9/40
U.S. Cl. 148—12.3                                  8 Claims

ABSTRACT OF THE DISCLOSURE

This invention relates to a process for the manufacture of races for anti-friction bearings by a forging process and a thermal treatment that results in the production of a metallurgical structure characterized by uniformly distributed carbides ranging in size from two to five microns.

THE BACKGROUND

Anti-friction bearings, and more particularly ball bearings, have been the object of intensive research in recent years. This research plus the advent of very clean vacuum degassed steels have resulted in the production of bearings of much longer dependable life and higher load carrying ability.

The critical element in ball bearings insofar as failure is concerned is almost inevitably the inner race. The inner races fail in fatigue as the result of the repeated application of extremely high compressive loads locally when a bearing ball passes over the race.

The ball bearings employed in the automotive industry are almost invariably prepared from a steel designated commercially as SAE 52100. This is an economical hypereutectoid steel containing one percent of carbon and about one and one-half percent chromium as the principal alloying ingredients. This steel is purchased in the form of seamless tubing and the individual inner race blanks are obtained by cutting off lengths of this tubing. These lengths must be machined, heat treated and ground to size to form the finished inner race.

THE INVENTION

This invention forms the ball bearing race by a procedure which has been modified to increase the B-10 life of these inner races by an order of four times that of the commercially produced bearings. The B-10 life of anti-friction bearings is defined as the time required to fail ten percent of any given bearing population when tested under carefully standardized and controlled conditions.

The steel employed for the production of inner races according to this invention is also SAE 52100, but is obtained in the form of discs. These discs are heated to a temperature to render them completely austenitic and to dissolve essentially all carbides. A suitable temperature is 2000° F. At this temperature the disc is forged by back extrusion to form it into a blank for an inner race.

After the forging operation the forged blank is permitted to air cool. The air cooling must be sufficiently rapid to prevent the formation of any massive carbides and to produce a very finely divided pearlitic structure. This very finely divided pearlitic structure is spheroidized by exposure to a temperature of between 1200° and 1500° F.

The object of this spheroidizing treatment is the production of uniformly distributed primary carbides which are sufficiently large to render the forging commercially machinable and not large enough to impair the life of the bearings in which these bearing inner races are incorporated. The optimum primary carbide size has been found to be between 2 and 5 microns. This yields an inner race bearing life four times as long as bearings as now conventionally produced from wrought tubing and does not cause undue problems of tool life in the machining operations.

This optimum size of primary carbides is obtained by a specific heat treat cycle. In the steels currently employed, austenite begins to form at about 1390° F. as the steel is heated. The desired mechanism in this spheroidization operation is basically to heat the steel to a temperature where austenite and carbides are in equilibrium and then slowly to cool the steel to precipitate the carbon in austenitic solution on the existing and undissolved carbide nuclei. The following is a typical spheroidizing cycle to accomplish this objective and to produce carbides in the desired 2 to 5 micron range.

The forgings are heated first for three hours to a temperature of 1380° F. which is just under the temperature at which austenite begins to form. The temperature is then held at 1420° F. which is well above the temperature at which austenite begins to form by the dissolution of carbon in gamma iron. After this sojourn in the austenite forming temperature range for three hours, the bearing races are dropped for three hours to 1380° F. which is just below the austenite forming temperature range. From the temperature of 1380° F. the temperature is dropped through five further successive steps, each lasting three hours and each twenty degrees Fahrenheit lower than the earlier step. Thus, the spheroidizing operation ends up with a three hour excursion at 1260° F. At this point the parts may be either air cooled, or cooled in the furnace. It is axiomatic that during this spheroidizing cycle the parts must be protected from oxidation or decarburization by an inert atmosphere such as nitrogen.

Upon the cooling portion of the spheroidization cycle, the transformation of austenite to ferritic products is sluggish. For this reason the spheroidization cycle is extended well below the austenite transformation temperature and for a substantial period of time. The total time for the spheroidization cycle may vary from 24 to 32 hours dependent upon the exact characteristics of the particular alloy treated and the characteristics of the equipment and operators at any given installation.

After spheroidize annealing, the forgings are then rough machined into inner races. They are then austenitized at 1550° F., quenched in oil to a martensitic structure, and immediately tempered to a hardness of $R_c$ 60 to 64. The austenitizing temperature can be from 1525° to 1600° F. and within this temperature range austenite of approximately 0.60 percent C is in equilibrium with carbide. The tempering temperatures required to produce the desired hardness are from 250° to 400° F. The heat treated microstructure consists of primary carbides in a matrix of tempered martensite. Normally, 5–15% retained austenite will also be present. The primary carbide size is 2–5 microns maximum diameter.

The hardened inner races are then finished ground and assembled into ball bearing assemblies. Outer races for these assemblies are made from tubing with the same carbide size as the inner races. The B–10 life of the forged inner races in F–208 size bearings is increased by a factor of 4.1 over that of inner races made from rolled tubing (from 61.1 to 252.9 hours). The inner races were subjected to a maximum Hertzian stress of 490,000 p.s.i. during testing.

This invention as been described particularly in connection with the production of anti-friction bearing inner races in contradistinction to the balls and the outer races. This is because the inner race durability is normally the factor limiting the life of anti-friction bearings. However, the sharp improvement effected by the application of the process of this invention to inner races may well shift the Achilles' heel of the bearing as a unit to the balls or the outer race. In this event further improvement in bearing life may be obtained by applying this process to the balls or the outer races and such is clearly within the scope of this invention.

It is desired to make of record in this document the following publications: Bamberger, E. N.: "The Effect of Ausforming on the Rolling Contact Fatigue Life of a Typical Bearing Steel," Transactions of the ASME Journal of Engineering for Power, Paper No. 65–Lub–9, pp. 1–10, October 1965; Bush, J. J., Grube, W. L., Robinson, G. H.: "Microstructural and Residual Stress Changes in Hardened Steel Due to Rolling Contact," Procedure of a Symposium on Rolling Contact Phenomena, pp. 365–399, October 1960, Elsevier Publishing Company, New York, 1962.

We claim as our invention:

1. The process of preparing inner races for anti-friction bearings comprising heating a blank of steel effectively devoid of elements forming carbides more refractory than chromium and having metallurgical characteristics indistinguishable from a steel containing 1.00% carbon, 0.35% manganese, 0.30% silicon and 1.45% chromium to a temperature resulting in a completely austenitic structure, forging the inner race at such temperature, air cooling the forged races sufficiently rapidly to avoid the formation of any massive carbides and to yield a very finely divided pearlitic structure, annealing the cooled blanks at a temperature from 1200° to 1500° F. and for a time sufficient to produce uniformly distributed, predominantly spherical particles of primary carbide ranging in size from two to five microns, said spheroidizing anneal including a holding period at a temperature slightly over that temperature at which austenite begins to form and for a time for sufficient carbon to dissolve in gamma iron so that upon decomposition of the gamma iron upon cooling the dissolved carbon precipitates upon existing small carbide nuclei to give a final carbide size of two to five microns, hardening the forged and annealed blanks by heating to a temperature and for a period of time insufficient to produce carbide growth, but sufficient to establish a thermodynamic equilibrium between austenite and undissolved carbide, quenching the heated blanks in a coolant producing a cooling rate approximating that of oil and finally tempering quenched races to a Rockwell C hardness of 60 to 64.

2. The process recited in claim 1 in which the spheroidizing anneal is carried out in approximately nine steps, the first of which is below the temperature at which austenite forms, the second of which is above the temperature at which austenite forms and the last seven steps are gradually descending in temperature to permit adequate time for the decomposition of austenite and the deposition of the resulting carbide upon existing carbide nuclei.

3. The process recited in claim 2 in which the steps have a duration of about three hours.

4. The process recited in claim 1 in which the hardening process includes an austenitizing step at a temperature of 1525° to 1600° F.

5. The process of preparing bearing components for anti-friction bearings comprising heating a blank of steel effectively devoid of elements forming carbides more refractory than chromium and having metallurgical characteristics indistinguishable from a steel containing 1.00% carbon, 0.35% manganese, 0.30% silicon and 1.45% chromium to a temperature resulting in a completely austenitic structure, forging the bearing component at such temperature, air cooling the forged races sufficiently rapidly to avoid the formation of any massive carbides and to yield a very finely divided pearlitic structure, annealing the cooled blanks at a temperature from 1200° to 1500° F. and for a time sufficient to produce uniformly distributed, predominantly spherical particles of primary carbide ranging in size from two to five microns, said spheroidizing anneal including a holding period at a temperature slightly over that temperature at which austenite begins to form and for a time for sufficient carbon to dissolve in gamma iron so that upon decomposition of the gamma iron upon cooling the dissolved carbon precipitates upon existing small carbide nuclei to give a final carbide size of two to five microns, hardening the forged and annealed blanks by heating to a temperature and for a period of time insufficient to produce carbide growth, but sufficient to establish a thermodynamic equilibrium between austenite and undissolved carbide, quenching the heated blanks in a coolant producing a cooling rate approximating that of oil and finally tempering quenched bearing components to a Rockwell C hardness of 60 to 64.

6. The process recited in claim 5 in which the spheroidizing anneal is carried out in approximaately nine steps, the first of which is below the temperature at which austenite forms, the second of which is above the temperature at which austenite forms and the last seven steps are gradually descending in temperature to permit adequate time for the decomposition of austenite and the deposition of the resulting carbide upon existing carbide nuclei.

7. The process recited in claim 6 in which the steps have a duration of about three hours.

8. The process recited in claim 5 in which the hardening process includes an austenitizing step at a temperature of 1525° to 1600° F.

References Cited
UNITED STATES PATENTS 3,369,942  2/1968  Bamberger et al. _____ 148—12
3,471,913  10/1969  Scott _____ 148—12

L. DEWAYNE RUTLEDGE, Primary Examiner

W. W. STALLARD, Assistant Examiner

U.S. Cl. X.R.

148—12.4

UNITED STATES PATENT OFFICE
CERTIFICATE OF CORRECTION

Patent No. 3,595,707     Dated July 27, 1971

Inventor(s) Richard L. Faunce and William M. Justusson

It is certified that error appears in the above-identified patent and that said Letters Patent are hereby corrected as shown below:

Col. 4, Claim 5, line 9, delete "races"

and substitute --bearing component--.

Signed and sealed this 18th day of April 1972.

(SEAL)
Attest:

EDWARD M. FLETCHER, JR.  
Attesting Officer

ROBERT GOTTSCHALK  
Commissioner of Patents